(12) United States Patent
Jonasson et al.

(10) Patent No.: US 12,415,521 B2
(45) Date of Patent: Sep. 16, 2025

(54) ON-BOARD ROAD FRICTION ESTIMATION

(71) Applicant: Volvo Truck Corporation, Gothenburg (SE)

(72) Inventors: Mats Jonasson, Partille (SE); Leo Laine, Härryda (SE); Leon Henderson, Härryda (SE)

(73) Assignee: Volvo Truck Corporation, Gothenburg (SE)

( * ) Notice: Subject to any disclaimer, the term of this patent is extended or adjusted under 35 U.S.C. 154(b) by 729 days.

(21) Appl. No.: 17/777,752

(22) PCT Filed: Dec. 10, 2019

(86) PCT No.: PCT/EP2019/084337
§ 371 (c)(1),
(2) Date: May 18, 2022

(87) PCT Pub. No.: WO2021/115561
PCT Pub. Date: Jun. 17, 2021

(65) Prior Publication Data
US 2022/0402498 A1    Dec. 22, 2022

(51) Int. Cl.
*B60W 40/068* (2012.01)
*B60W 60/00* (2020.01)

(52) U.S. Cl.
CPC ........ *B60W 40/068* (2013.01); *B60W 60/001* (2020.02); *B60W 2520/125* (2013.01);
(Continued)

(58) Field of Classification Search
CPC .................................................. B60W 40/068
See application file for complete search history.

(56) References Cited

U.S. PATENT DOCUMENTS

| 8,983,749 B1 | 3/2015 | Singh |
| 10,046,770 B1 | 8/2018 | Sabri |

(Continued)

FOREIGN PATENT DOCUMENTS

| CN | 102024095 A | 4/2011 |
| CN | 104442830 A | 3/2015 |

(Continued)

OTHER PUBLICATIONS

Reasons for Rejection for Japanese Patent Application No. 2022534819, mailed Sep. 8, 2023, 7 pages.

(Continued)

*Primary Examiner* — Christian Chace
*Assistant Examiner* — Katherine Marie Fitzharris
(74) *Attorney, Agent, or Firm* — Withrow & Terranova, PLLC (57) ABSTRACT

A road friction coefficient of a vehicle is estimated by obtaining substantially contemporaneous values associated with a steering angle for a steered axle of the vehicle, a lateral acceleration, a yaw acceleration, an alignment torque and an axle load on the steered axle; estimating a lateral tire force on the basis of the steering angle, lateral acceleration, and yaw acceleration; deriving a pneumatic trail from the alignment torque and estimated lateral tyre force; and estimating a road friction coefficient from the lateral tire force, the axle load, and the pneumatic trail. In embodiments, the derivation of the road friction coefficient includes evaluating a nonlinear function of the pneumatic trail.

10 Claims, 5 Drawing Sheets

(52) U.S. Cl.
CPC ..... *B60W 2520/14* (2013.01); *B60W 2530/10* (2013.01); *B60W 2530/20* (2013.01); *B60W 2540/18* (2013.01); *B60W 2552/40* (2020.02)

(56) References Cited

U.S. PATENT DOCUMENTS

| | | | |
|---|---|---|---|
| 10,131,360 B2 | 11/2018 | Sabri et al. | |
| 10,272,919 B2 | 4/2019 | Ghoneim et al. | |
| 10,308,282 B2 | 6/2019 | Katzourakis et al. | |
| 2010/0077847 A1* | 4/2010 | Joe | G01M 17/02 73/146 |
| 2013/0074576 A1 | 3/2013 | Kouchi et al. | |
| 2015/0185036 A1 | 7/2015 | Braeuchle et al. | |
| 2018/0105181 A1 | 4/2018 | Skold et al. | |
| 2018/0106714 A1 | 4/2018 | Skold et al. | |
| 2019/0185053 A1* | 6/2019 | Wuthishuwong | B62D 6/00 |

FOREIGN PATENT DOCUMENTS

| | | |
|---|---|---|
| CN | 105667520 A | 6/2016 |
| EP | 3501944 A1 | 12/2017 |
| JP | 2005096672 A | 4/2005 |
| JP | 2008170237 A | 7/2008 |
| JP | 2010083472 A | 4/2010 |
| JP | 2013007703 A * | 1/2013 |
| WO | 2013182257 A1 | 12/2013 |
| WO | 2019026114 A1 | 2/2019 |
| WO | 2019189096 A1 | 10/2019 |

OTHER PUBLICATIONS

Hong, S. et al., "Tire-Road Friction Coefficient Estimation with Vehicle Steering," 2013 IEEE Intelligent Vehicles Symposium (IV), Jun. 23-26, 2013, Gold Coast, Australia, IEEE, 6 pages.

Pacejka, H., "Tyre and Vehicle Dynamics," Jan. 2002, Elsevier B.V., 621 pages.

International Search Report and Written Opinion for International Patent Application No. PCT/EP2019/084337, mailed Aug. 14, 2020, 14 pages.

Office Action for Korean Patent Application No. 1020227023119, mailed Apr. 29, 2024, 12 pages.

First Office Action for Chinese Patent Application No. 201980102824. 0, mailed Jan. 21, 2025, 14 pages.

* cited by examiner

ON-BOARD ROAD FRICTION ESTIMATION

This application is a 35 USC 371 national phase filing of International Application No. PCT/EP2019/084337, filed Dec. 10, 2019, the disclosure of which is incorporated herein by reference in its entirety.

TECHNICAL FIELD

The present disclosure relates to the field of machine-assisted driving, partially or fully automated driving. It provides a method and system for on-board estimation of road friction, which may reduce or eliminate the need for a human operator monitoring this aspect of the driving environment.

BACKGROUND

A person driving a car without power steering on a slippery road will get early warnings: when the road friction drops, the driver will notice that less torque is needed to maintain the wheel at the desired angle. This is because the self-aligning torque at the wheels depends on the road friction. Most drivers of manually steered cars would notice even a slight degradation of road conditions and could then decide to slow down or take other safety measures.

Power steering systems add controlled energy to the steering mechanism, so that the driver may turn the steered wheels with less effort. Power steering can be engineered to provide some artificial feedback of forces acting on the steered wheels. While it takes more attentive or experienced drivers to notice an icy road based on steering wheel feedback that reaches them through the intermediary of a power steering system, the overall safety is still higher in modern cars, where anti-lock braking, anti-spin and various stability control systems assist. It would be desirable to further raise that safety level by somehow utilizing road response data that is available, at least in theory, in the vehicle. This reasoning is all the more valid for automated or autonomous vehicles, where reactions of an accompanying person cannot be relied upon as a fallback if automatic monitoring fails.

US20180106714A1 discloses a method for determining a friction estimate between a road surface and a tire of a vehicle. The tire is arranged on a steerable wheel of the vehicle, which has an axle rack pivotably attached to a linkage arm connected to the steerable wheel such that a translational motion of the axle rack causes the linkage arm to rotate about a kingpin element, whereby the linkage arm causes the steerable wheel to turn. The method includes acquiring a plurality of rack force values, acquiring a plurality of lateral wheel force values, mapping a relation between the plurality of rack force values and the lateral wheel force values to a model, and determining the lateral friction estimate based on the mapping. The model assumes a linear relation between the lateral wheel force and the rack force; the model is fitted to pre-acquired empirical data by linear regression.

It would be desirable to improve the mathematical modelling in road friction estimation, ultimately to provide more faithful estimates.

SUMMARY

It is an object of the invention to provide a computationally efficient and physically accurate method and device for estimating road friction on board a vehicle. The object is achieved by the method and devices according to the independent claims.

In a first aspect, there is provided a method of estimating a road friction coefficient of a vehicle.

In a second aspect, there is provided a vehicle with sensors and processing circuitry for estimating a friction coefficient between the vehicle's tyres and the road.

In a third aspect, there is provided a computer program for estimating a road friction coefficient of a vehicle. The computer program comprises computer program code which when executed by a computer causes the computer to carry out the method of the first aspect.

In one embodiment, the derivation of the road friction coefficient includes evaluating a pre-determined nonlinear function of the pneumatic trail. This improves accuracy compared to estimation methods according to the state of the art.

In one embodiment, the nonlinear function is equal to any of $$\frac{F_y}{m_f g \tanh \frac{3a-9t_p}{2a}},$$

$$\frac{F_y}{m_f g \operatorname{arctanh} \frac{3a-9t_p}{2a}},$$

$$\frac{F_y}{m_f g} \frac{2a}{3a-9t_p}$$

or scaled versions thereof, where g is gravitational acceleration, 2a is a tyre contact length, $F_y$ is lateral tyre force and $t_p$ is the pneumatic trail. These functions enable accurate friction estimation while being computationally efficient. For example, the functions may be approximately equal to power series that converge well.

In one embodiment, the derivation of the pneumatic trail further comprises correcting for a caster trail ($t_c$) of the vehicle. The caster trail is a geometric property that can be determined in the design phase and be pre-stored in the vehicle. The correction for caster trail improves the accuracy of the road friction estimation.

In one embodiment, there is furthermore included a computation of a tolerance range associated with the road friction coefficient. Access to knowledge of the tolerance range allows the estimated friction coefficient value to be used in a safe and statistically sound manner, which may ultimately improve the safety of a driving control system in an autonomous vehicle and/or a driver assistance system in a conventional vehicle.

In one embodiment, there is furthermore provided an evaluation of the lateral tyre force and alignment torque with respect to threshold values for the lateral tyre force and the alignment torque. This may help ensure that the estimation is carried out only in conditions in which the included approximations of physical laws are justified. In particular, the evaluation may return a reliability appraisal of the estimated road friction coefficient.

In one embodiment, the estimated road friction coefficient is used as basis for controlling the vehicle. Compared with vehicle control techniques which are based on estimation of the road friction coefficient by prior art methods, this embodiment enables more accurate and/or reliable control of the vehicle. In particular, the vehicle control may include taking a safety-relevant action in the vehicle in response to an evaluation of the estimated road friction coefficient. This may improve the safety of the vehicle's operation and movements.

In certain embodiments, the method according to the first aspect is implemented in a vehicle, a vehicle enabled for autonomous driving, an autonomous vehicle and/or in a processing unit receiving data from a vehicle. In the case where a processing unit partially or wholly executes the method for (input) data that it receives from a vehicle, the computational load on processors in the vehicle, which are typically powered from a finite energy source, may be offloaded. The processing unit may be transmitting (output) data, including the estimated road friction coefficient, to the vehicle in return.

In one embodiment, a vehicle according to the second aspect includes a pneumatic trail estimator which is configured to derive an alignment torque from a control signal which controls the steering actuator. This constitutes a simple way of obtaining the alignment torque, which is also physically justified, as explained below.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Embodiments of the invention will now be described, by way of example, with reference to the accompanying drawings, on which.

DETAILED DESCRIPTION

The structure and characteristics of power steering systems of various types will be outlined initially.

Figure 1:
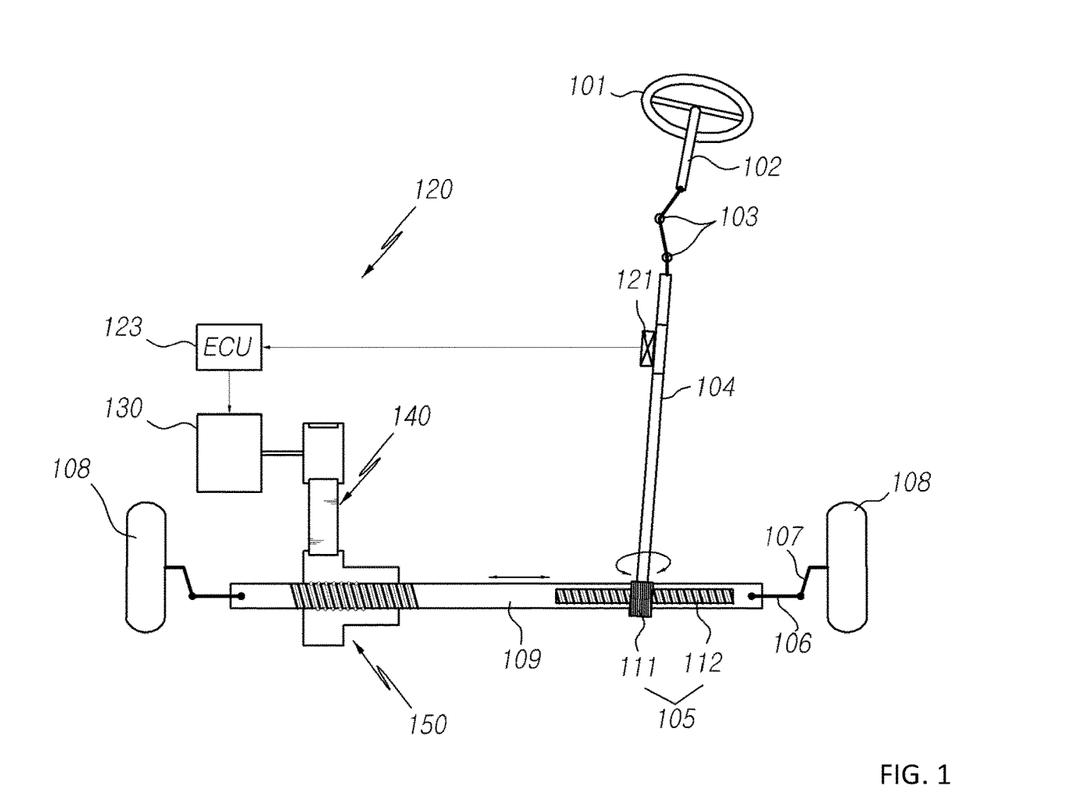
FIG. 1 is a schematic view of an electric power steering system.

FIG. 1 shows a portion of an electrically actuated power steering system 100 acting on a steered axle of a vehicle. The basic structure of the steering includes a steering wheel 101, 102, to which a manual torque is applied. The steering wheel is connected over linkage 103, 104 and a rack and pinion mechanism 105 to a linearly displaceable steering rack 109. The rack and pinion mechanism 105 may include a circular 111 and linear 112 gear. Via tie rods 106, a displacement of the steering rack 109 causes the respective steered wheels 108 to swivel by angles $\delta_1$, $\delta_2$ that depend on the geometry of the wheel suspension 107. The steering torque exerted by the tie rods 106 is balanced by an alignment torque (or self-aligning torque) $M_z$ (shown in FIG. 2) acting on the centre of each wheel hub, owing to longitudinal and lateral road forces on the contact surface of the wheels 108. The alignment torque is approximately proportional to the rack force:

$$M_z = K_1 \times (\text{rack force}). \tag{1}$$

According to the example in FIG. 1, a power steering overlay 120 includes a torque sensor 121 for sensing the manual torque and an electric motor 130 whose output torque is transmitted, via a belt 140 and gear 150, to the steering rack 109. The electric motor 130 is an actuator in the electric power steering system 100. An electronic control unit 123 controls the output torque $T_{em}$ of the motor 130 in dependence of the manual torque applied to the steering wheel 101, according to a preconfigured function. For example, the function may be a linear relationship with a constant or speed-dependent gain. In one example, there is a linear relationship between the rack force and electric motor torque:

$$(\text{rack force}) = K_2 T_{em}. \tag{2}$$

By (1) and (2), there follows a linear relationship between the electric motor torque (actuator setting) and alignment torque:

$$M_z = K_3 T_{em}. \tag{3}$$

In an autonomous vehicle, the manual torque that the driver exerts on the steering wheel corresponds to a corresponding action of a control system responsible for driving the car. For example, the steering movements may be carried out as a result of control signals supplied to the motor 130. The linear relationship (2) between the rack force and electric motor torque remains valid in the autonomous vehicle.

In a typical hydraulic power steering system, the current actuator setting corresponds to the pressure of hydraulic oil admitted by an actuator valve. The steering rack maybe acted upon in such manner that the rack force is proportional to the oil pressure:

$$(\text{rack force}) = K_4 \times (\text{oil pressure}). \tag{4}$$

From the generally applicable equation (1), there follows a linear relationship, analogous to equation (3), with the alignment torque:

$$M_z = K_5 \times (\text{oil pressure}). \tag{5}$$

In a manual-driving mode of a power steering system with both electric and hydraulic actuation, one may have:

$$(\text{rack force}) = K_5 \times (\text{oil pressure}) \times K_6 \times (\text{torsion bar torque}) + K_7 \times (\text{dynamic steering torque}). \tag{6}$$

In an automated-driving mode of this power steering system, the following relationship holds:

$$(\text{rack force}) = K_9 \times (\text{oil pressure}) \times K_{10} \times (\text{dynamic steering torque}). \tag{7}$$

Some vehicles manufactured by the applicant are equipped with power steering systems of this type.

Common to all the considered types of power steering systems, the approximation according to equation (1) is valid. Therefore, a linear or approximately linear relation between the actuator setting and rack force holds. Autonomous vehicles generally do not differ from conventional cars in this respect.

Figure 2:
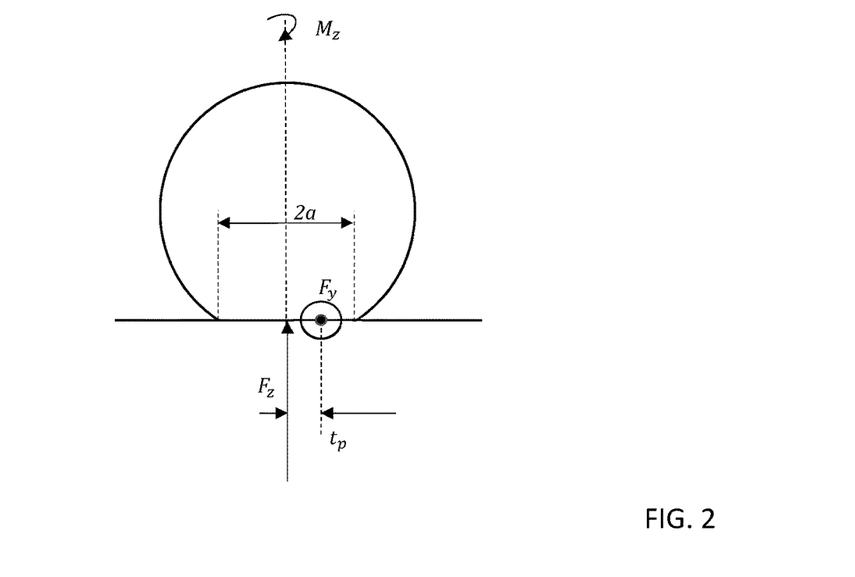
FIG. 2 is a lateral view of a tyre illustrating quantities relevant for road friction estimation.

The modelling of the road-wheel interaction will now be addressed with reference to FIG. 2, which is a lateral view of an idealized tyre illustrating quantities relevant for road friction estimation. In FIG. 2, $M_z$ denotes the alignment torque, $F_y$ the lateral tyre force, $F_z$ the vertical (or normal)

tyre force, 2a the tyre contact length and $t_p$ the pneumatic trail. According to the "brush model" with parabolic normal load distribution (see H. B. Pacejka, *Tyre and Vehicle Dynamics*, Society of Automotive Engineers, 2002), the following relationships hold:

$$F_y = 3\mu F_z \theta_y \sigma_s \left(1 - |\theta_y \sigma_s| + \frac{1}{3}(\theta_y \sigma_s)^2\right), \quad (8)$$

$$M_z = -\mu F_z a \theta_y \sigma_s \left(1 - 3|\theta_y \sigma_s| + 3(\theta_y \sigma_s)^2 - |\theta_y \sigma_s|^3\right),$$

$$t_p = -\frac{M_z}{F_y} = \frac{a}{3}\left(\frac{1 - 3|\theta_y \sigma_s| + 3(\theta_y \sigma_s)^2 - |\theta_y \sigma_s|^3}{1 - |\theta_y \sigma_s| + \frac{1}{3}(\theta_y \sigma_s)^2}\right),$$

where $$\theta_y = \frac{C}{3\mu F_z}$$

and $\sigma_s = \tan \alpha$, with $\alpha$ the tyre lateral slip (or side slip) angle and C the tyre cornering stiffness (unit: 1 N/rad).

Figure 3:
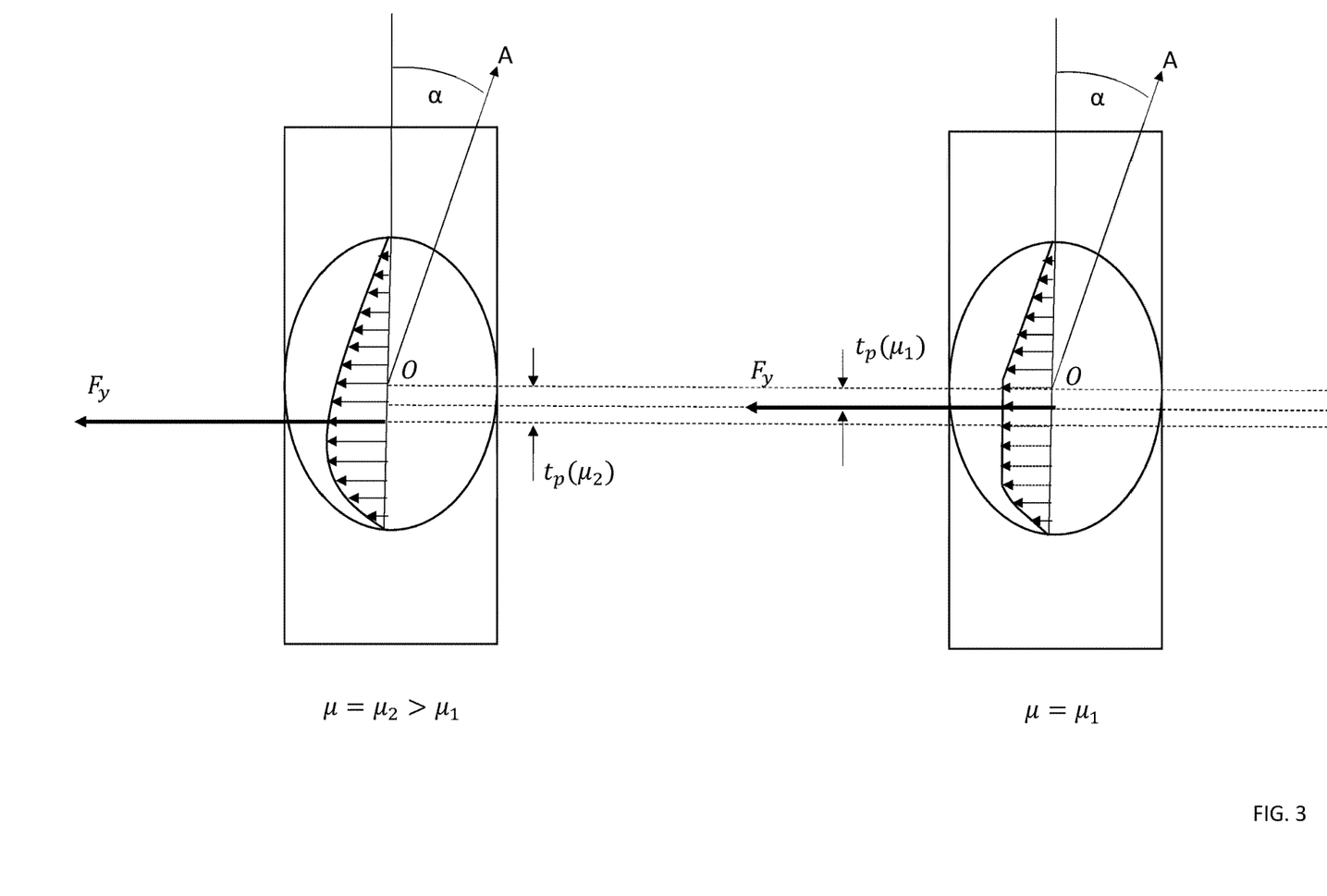
FIG. 3 illustrates the location of the pneumatic trail for two different values of the road friction coefficient.

The tyre lateral slip angle $\alpha$ is illustrated in FIG. 3, where O denotes the wheel centre in the horizontal plane and OA is the direction of travel. The left and right halves of FIG. 3 show a case of relatively higher road friction coefficient $\mu = \mu_2$ (left), corresponding to pure adhesion, and a case of relatively lower friction coefficient $\mu = \mu_1$ (right). In the low-friction case (right), the central portion of the tyre is sliding, as suggested by the dashed horizontal arrows with equal length, indicating that the local friction force has its saturated magnitude. The pneumatic trail $t_p$, which indicates the displacement of the resultant lateral tyre force $F_y$ with respect to the wheel centre O, therefore is different for the two values $\mu_1$, $\mu_2$ of the friction coefficient. This is one of the physical principles underlying the present inventions.

While the "brush model" is known to have high reliability in many applications, the inventors have realized that its many nonlinear features makes it computationally demanding and therefore less suited for on-board road friction estimation, which is generally performed in real time. Embodiments of the present invention may instead use a simplified model, which was initially presented and verified in EP3309024A1. The simplified model was disclosed in the context of estimating road friction based on front and rear wheel axle torque, longitudinal acceleration and a pitch rate of the vehicle. According to the simplified model, the lateral force is approximated by:

$$F_y = \mu F_z \tanh \frac{C\alpha}{\mu F_z}, \quad (8.1)$$

where tanh is the hyperbolic tangent function. Based on curve-fitting considerations, the simplified model can be generalized to include the following alternative approximations, or scaled versions thereof, of the lateral force:

$$F_y = \mu F_z \operatorname{arctanh} \frac{C\alpha}{\mu F_z}, \quad (8.2)$$

$$F_y = \mu F_z \left(\frac{C\alpha}{\mu F_z} - \frac{1}{3}\left(\frac{C\alpha}{\mu F_z}\right)^3\right), \quad (8.3)$$

where arctanh is the inverse hyperbolic tangent function. The scaling may include applying a scaling coefficient c to an input variable (e.g., f(cx)) or an output variable (e.g., cf(x)).

For small $C\alpha/\mu F_z$, the pneumatic trail according to equation (10) can be approximated by the Maclaurin expansion $$t_p = \frac{a}{3}\left(1 - \frac{2}{3}\frac{C\alpha}{\mu F_z} + O\left(\left(\frac{C\alpha}{\mu F_z}\right)^2\right)\right), \quad (10.1)$$

where 'big-O' notation is used for brevity. The expansion might not be fully accurate outside $$0 \le t_p \le \frac{a}{3}.$$

Inside this range, and ignoring the higher-order terms $$O\left(\left(\frac{C\alpha}{\mu F_z}\right)^2\right),$$

equation (10.1) is equivalent to $$\frac{C\alpha}{\mu F_z} = \frac{3a - 9t_p}{2a}. \quad (11)$$

Applying equality (11) to equation (8.1) and solving for $\mu$, one obtains the friction coefficient as a function of the pneumatic trail, the lateral and vertical forces:

$$\mu = \frac{F_y}{F_z \tanh \frac{3a - 9t_p}{2a}}. \quad (12.1)$$

If instead equation (8.2) or (8.3) is used for the last step, one obtains, respectively, $$\mu = \frac{F_y}{F_z \operatorname{arctanh} \frac{3a - 9t_p}{2a}} \quad (12.2)$$

and $$\mu = \frac{F_y}{F_z} \frac{2a}{3a - 9t_p}. \quad (12.3)$$

Optionally, to improve the stability of numerical evaluations, the functions according to equations (12.1), (12.2) and (12.3) may be patched with a $t_p$-independent segment, so as to avoid the singularity. For example, equation (12.1) may be replaced by $$\mu = \frac{F_y}{F_z \max\left\{\rho, \tanh \frac{3a - 9t_p}{2a}\right\}}, \text{ where } \rho = \frac{F_y}{\mu_{max} F_z}. \quad (13.1)$$

If for example $\mu_{max}$ is set to 1, then $\mu \le 1$ everywhere. Similar patching may be applied to equations (12.2) and (12.3).

The lateral force $F_y$ appearing in the above approximations of the friction coefficient $\mu$ can be estimated from the lateral acceleration $a_y$ of the centre of gravity of the vehicle and the yaw acceleration $d\omega_z/dt$ of the vehicle. Values of one or both of these quantities may be obtained from an accelerometer, a position sensor, a global navigation satellite system (GNSS) receiver, a real-time kinematic (RTK) instrument, a gyroscopic device, an inertial sensor, an inertial measurement unit (IMU) or any equivalent instrument arranged in the vehicle. An instrument capable of determining a position and/or orientation of the vehicle will be generically referred to herein as a position and orientation sensor. The yaw acceleration $d\omega_z/dt$ can be obtained directly from an instrument; alternatively, a sensor provides the yaw rate co, and its time derivative is computed numerically. Obtaining lateral acceleration and yaw acceleration of a vehicle is known in general and will therefore not be discussed in more detail herein. Based on the values of the lateral acceleration and yaw acceleration, the lateral force is given by $$F_y = \frac{m_f\left(a_y + l_f \frac{d}{dt}\omega_z\right)}{\cos\delta}, \quad (14)$$

where $m_f$ denotes the axle load on the steered axle, $l_f$ the distance from centre of gravity to the steered axle and $\delta$ the steering angle. It is emphasized that the steered axle may be the front axle or any other axle of the vehicle.

The pneumatic trail $t_p$ appearing in the above approximations of the friction coefficient $\mu$ can be estimated from a current value of the steering actuator setting and the caster trail $t_c$, which like the distance $l_f$ is a constant defining the vehicle geometry. The caster trail may be of the order of centimetres. Based on the equation $M_z = (t_c + t_p)F_y$, which relates the alignment torque, lateral force, caster trail and pneumatic trail, one obtains on the one hand:

$$t_p = \frac{M_z}{F_y} - t_c. \quad (15)$$

On the other hand, it is recalled from the discussion above that a linear relation $$M_z = kM_{act} \quad (16)$$

may be assumed between the alignment torque and a steering actuator setting, which is here denoted by $M_{act}$. The steering actuator setting may correspond to a control signal controlling a steering actuator of the vehicle. The constant k may depend on gear ratio, electric gain, system oil pressure and the like. Combining equations (15) and (16), one obtains $$t_p = \frac{kM_{act}}{F_y} - t_c. \quad (17)$$

Equations (14), (17) and the axle load $m_f$ provide sufficient information to evaluate each of equations (12.1), (12.2) and (12.3) or the modified equation (13.1).

Figure 5:
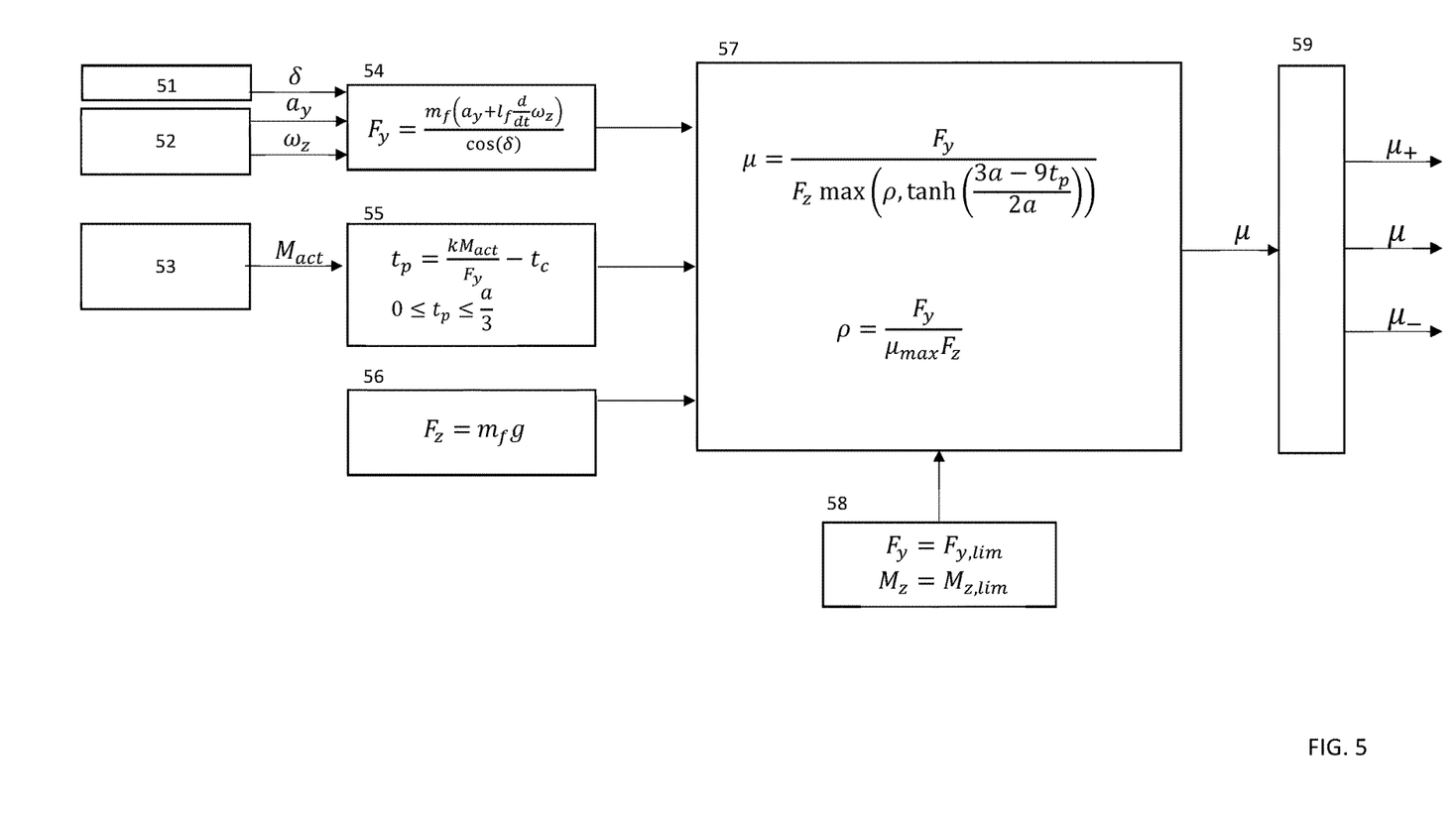
FIG. 5 is a functional block diagram of sensors and processing circuitry in a vehicle.

FIG. 5 is a functional block diagram of sensors and processing circuitry adapted to estimate a road friction coefficient as disclosed herein. FIG. 5 shows a steering angle sensor 51 configured to provide the steering angle to a lateral tyre force estimator 54. The lateral tyre force estimator 54 furthermore obtains a lateral acceleration and yaw acceleration of the vehicle from a position and orientation sensor 52. A control signal $M_{act}$ which controls a steering actuator 53 is provided (e.g., in parallel) to a pneumatic trail estimator 55. An axle load estimator 56 provides the axle load and/or the vertical force to other parts of the processing circuitry. A road friction estimator 57 receives the outputs of the lateral tyre force estimator 54, the pneumatic trail estimator 55 and the axle load estimator 56 and estimates, based thereon, the road friction coefficient. As suggested by FIG. 5, the road friction estimator 57 is configured to evaluate equation (13.1); equations (12.1), (12.2), (12.3) or rescaled and/or patched versions thereof are useful equivalents.

A first post-processing unit 58 is adapted to perform screening of the current driving situation and, on that basis, determine the reliability of the estimated road friction coefficient. For example, the accuracy may be better for moderate or large lateral tyre force and alignment torque. Conversely, the estimation approach may perform poorly when the vehicle is driving straight, wherein the lateral forces are typically small and may be difficult to measure accurately. In one embodiment, the first post-processing unit 58 is configured to indicate that the reliability of the estimation is acceptable while the vehicle is driving at such speed and with such yaw acceleration that the tyre contact is partially sliding, as shown in the right-hand half ($\mu=\mu_1$) of FIG. 3. Alternatively, the first post-processing unit 58 may be configured to indicate acceptable reliability when the lateral force and the alignment torque exceed predetermined threshold values $F_{y,lim}$, $M_{z,lim}$.

The first post-processing unit 58 may further be configured to evaluate the estimated road friction coefficient $\mu$ with respect to a threshold friction value, representing safe driving. The evaluation may take into account a planned continued trajectory of the vehicle. If the evaluation suggests that the driving is or may become unsafe, safety-oriented measures may be ordered.

Alternatively or additionally, a second post-processing unit 59 operates, which is configured to derive a tolerance of the road friction coefficient. The tolerance may be expressed as a tolerance interval $[\mu_-, \mu_+]$ in which, at a predefined confidence level, the true value of the road friction coefficient lies. The tolerance can be computed by repeating the estimation with slightly different values of a constant. For example, the cornering stiffness C in equation (10.1) can be varied above and below the true value that is believed to apply for the tyres of the vehicle. A slightly greater value $C_+$ of the cornering stiffness will provide an alternative approximation $t_{p,+}$ of the pneumatic trail, whereby an upper bound $\mu_+$ on the road friction coefficient is obtained. The second post-processing unit 59 may be configured similarly to find a lower bound $\mu_-$ on the road friction coefficient. It is also possible to compute the tolerance by accounting for known uncertainties of the approximations. For example, if equation (10.1) is known to underestimate the pneumatic trail gradually as $C\alpha/3 \mu F_z$ grows, one may consider re-evaluating equation (13.1) (or its equivalents) to obtain an alternative approximation $t_{p,+}$ of the pneumatic trail augmented with a safety margin, whereby an upper bound $\mu_+$ on the road friction coefficient is obtained. The safety margin may be a scaling factor or an added constant. Further alternatively, statistical approaches may be adopted.

The functional blocks in FIG. 5 that represent processing circuitry, including the lateral tyre force estimator 54, pneumatic trail estimator 55, road friction estimator 57 and the optional post-processing units 58, 59, may be implemented as software in a common computer program, as a plurality of cooperating sub-programs, as application-specific or programmable analogue or digital signal processing circuitry, and equivalent solutions. Implementations within the scope of the invention may have the exemplifying functional structure illustrated in FIG. 5 or a different structure. The processing circuitry may be located in the vehicle, for which the road friction coefficient is estimated, or may refer to networked processing resources.

Figure 6:
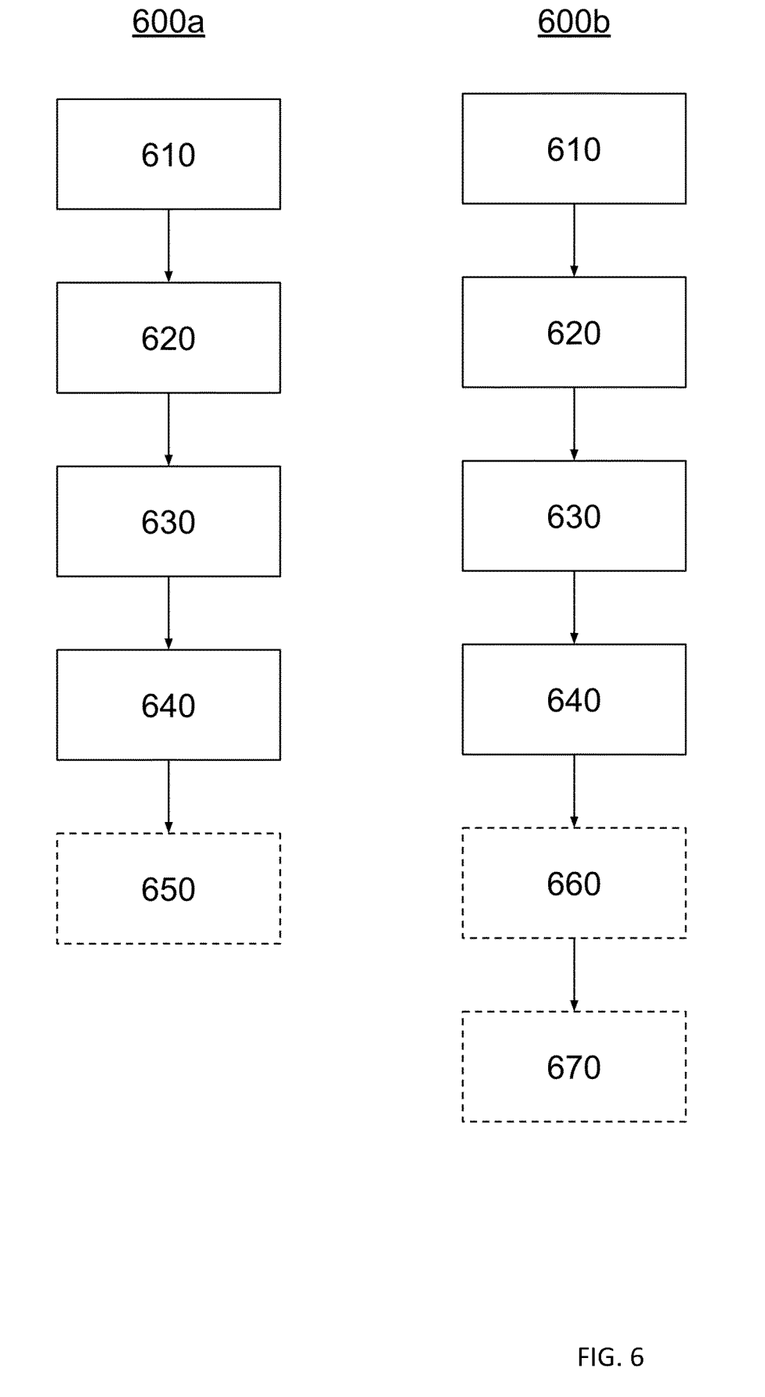
FIG. 6 is a flowchart illustrating methods according to two embodiments the invention.

FIG. 6 is a flowchart illustrating methods 600a, 600b of estimating friction between a road and a tyre of a vehicle, in accordance with two embodiments of the invention. The first four steps 610, 620, 630, 640 are common to both methods.

In the first step 610, substantially contemporaneous values associated with a steering angle δ for a steered axle of the vehicle, a lateral acceleration $a_y$, a yaw acceleration $d\omega_z/dt$, an alignment torque $M_z$ and an axle load $m_f$ on the steered axle are obtained. The values may be obtained from sensors and instruments arranged in the vehicle. Alternatively, some of the values may be captured by external sensors, such as by a camera determining a position and/or orientation of the vehicle or by a scale determining an axle load, or may be input by an operator. The obtained values are associated with the respective quantities in the sense that they are measurements or approximations of these; it is not essential for the invention that the obtained values are in exact agreement with the quantities.

In the second step 620, the lateral tyre force $F_y$ is estimated on the basis of the steering angle, lateral acceleration and yaw acceleration. The estimation may include evaluating one of equations (8.1), (8.2) and (8.3).

In the third step 630, the pneumatic trail $t_p$ is derived from the alignment torque and the lateral tyre force which was estimated in the second step 620. The derivation may include evaluating equation (10.1), possibly while disregarding higher-order terms.

In the fourth step 640, the road friction coefficient μ is estimated based on the estimated lateral tyre force, the axle load and the pneumatic trail, which was derived in the third step 630. The execution of the fourth step 640 may include evaluating any of equations (12.1), (12.2), (12.3) or (13.1).

Figure 4:
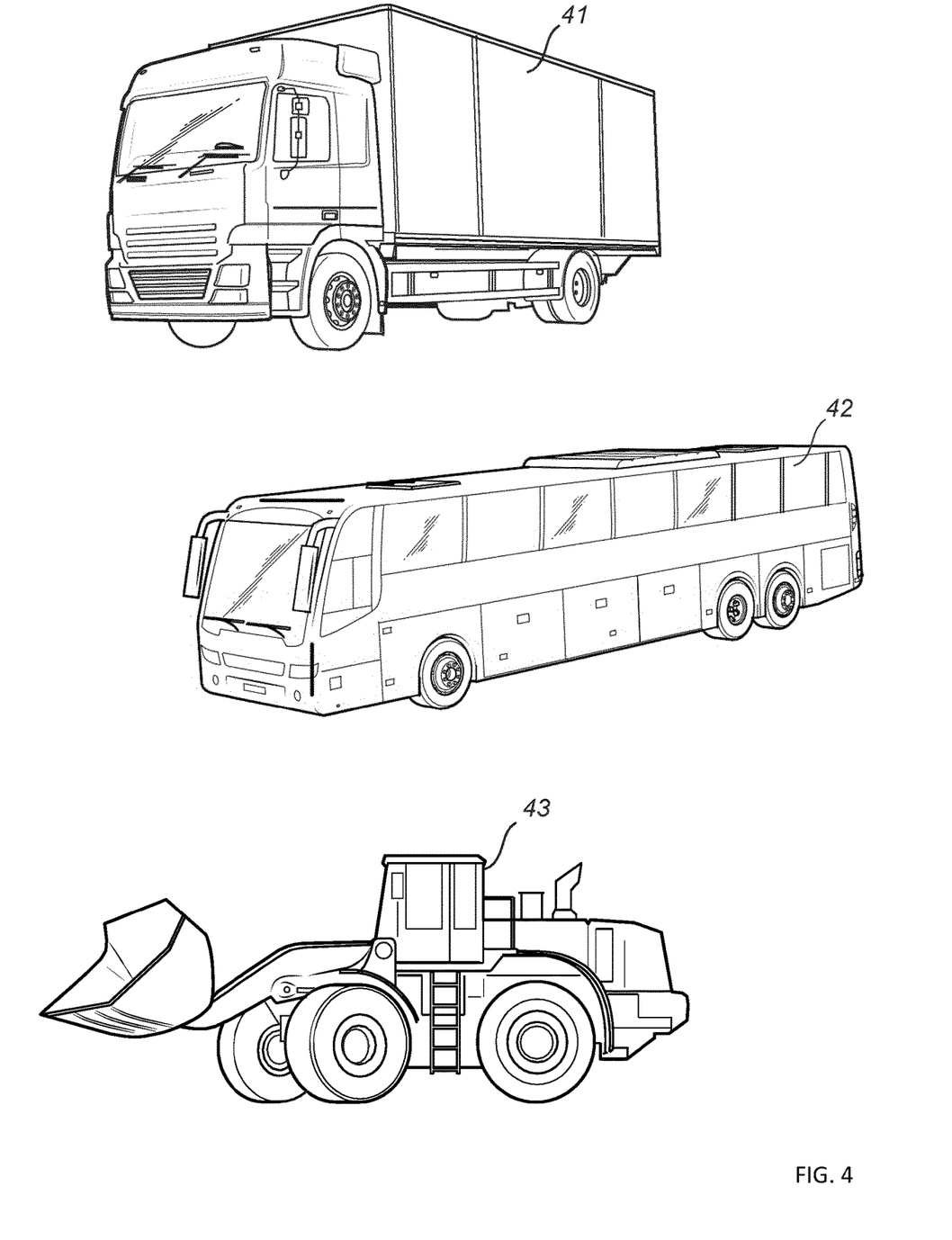
FIG. 4 shows example vehicles in or for which the invention may be implemented.

The computations within the second, third and fourth steps 620, 630, 640 may be performed by processing circuitry arranged in the vehicle, a processing unit receiving data from the vehicle, or processing facilities available over a network (cloud computing). As such, the methods 600a, 600b may be fully or partially implemented in a vehicle. The vehicle may have at least one steered axle and a total of two or more axles, as exemplified by the truck 41, bus 42 and heavy equipment 43 in FIG. 4. The estimation may be particularly beneficial to detect a deterioration in road friction of an automated or autonomous vehicle, where driver reactions may not be relied upon.

The methods 600a, 600b may be carried out by a computer, or a plurality of computers, executing instructions in a computer program according to an embodiment of the invention. The computer program may be stored on a computer-readable medium. The computer-readable medium may be an optical disc, a magnetic medium, a solid-state memory, an electric memory, and more precisely a random access memory, a read-only memory, a flash memory, a memory stick. Each of the types of computer-readable media may be volatile or non-volatile. Furthermore, the computer program may be distributed or loaded into a processor by means of a transitory computer-readable medium, such as a modulated carrier wave. A computer-readable medium with a computer program stored thereon constitutes a computer program product.

In one embodiment, the method 600a is extended by an optional fifth step 650 of deriving a tolerance range $[\mu_-, \mu_+]$ associated with the road friction coefficient. As regards these derivations, reference is made to the description of the second post-processing unit 59, above. The derivation may be such that there is a guaranteed probability (confidence level) that the true value of the road friction coefficient lies in the tolerance range.

In another embodiment, the method 600b is extended by an optional step 660 of determining the reliability of the estimated road friction coefficient. In the optional step 660, the lateral force and the alignment torque are evaluated with respect to threshold values $F_{y,lim}$, $M_{z,lim}$. If the lateral force and/or the alignment torque are found to be too small, the estimated road friction coefficient may be rejected as unreliable. Reference is made to the description of the first post-processing unit 58, above. The use of the estimate for controlling the vehicle and similar purposes may be inhibited. Further optionally, the evaluation in step 660 may be followed by a further step 670 of taking a safety-relevant action in the vehicle in response to a value of the estimated road friction coefficient. The execution of the further step 670 may be conditional upon a positive finding in the evaluation step 660, i.e., that the estimate is a reliable one.

Another embodiment of the invention provides a method of controlling a vehicle including the first, second, third and fourth steps 610, 620, 630, 640 described above. The method comprises a subsequent step of controlling the vehicle based on the estimated road friction coefficient. Said controlling may comprise taking a safety-relevant action in the vehicle 41, 42, 43 in response to a value of the estimated road friction coefficient or an evaluation of the road friction coefficient with respect to current or expected driving conditions; this step may be similar to the further step 670 described above. As noted above, parts of the method, in particular the second, third and fourth steps 620, 630, 640, may be implemented outside the vehicle.

The aspects of the present invention have mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of estimating a road friction coefficient of a vehicle, the method comprising:
    obtaining substantially contemporaneous values associated with a steering angle (δ) for a steered axle of the vehicle, a lateral acceleration ($a_y$), a yaw acceleration ($d\omega_z/dt$), an alignment torque ($M_z$), and an axle load ($m_f$) on the steered axle;
    estimating a lateral tire force ($F_y$) on the basis of the steering angle, lateral acceleration, and yaw acceleration;
    deriving a pneumatic trail ($t_p$) from the alignment torque ($M_z$) and the estimated lateral tire force ($F_y$); and
    estimating a road friction coefficient (μ) from the lateral tire force, the axle load, and the pneumatic trail,
    wherein the method further comprises at least one of:
    i) estimating the road friction coefficient by evaluating a predetermined nonlinear function of the pneumatic trail, wherein the nonlinear function is at least equal to any of:

$$\frac{F_y}{m_f g \tanh\frac{3a - 9t_p}{2a}},$$

$$\frac{F_y}{m_f g \, \text{arctanh} \frac{3a - 9t_p}{2a}},$$

$$\frac{F_y}{m_f g} \frac{2a}{3a - 9t_p}$$

or scaled versions thereof, where g is gravitational acceleration, 2a is a tyre contact length, $F_y$ is lateral tyre force and $t_p$ is the pneumatic trail;

ii) deriving a tolerance range ($\mu_-$, $\mu_+$) associated with the road friction coefficient; and iii) evaluating the lateral tire force and alignment torque with respect to threshold values ($F_{y,lim}$, $M_{z,lim}$) for the lateral tire force and the alignment torque.

2. The method of claim 1, wherein the derivation of the pneumatic trail further comprises correcting for a caster trail ($t_c$) of the vehicle.

3. The method of claim 1, wherein the evaluation provides a reliability appraisal of the estimated road friction coefficient.

4. The method of claim 1, further comprising controlling the vehicle based on the estimated road friction coefficient.

5. The method of claim 4, wherein the controlling further comprises taking a safety-relevant action in the vehicle in response to an evaluation of the estimated road friction coefficient.

6. The method of claim 1, which is implemented in one or more of: a vehicle, a vehicle enabled for autonomous driving, an autonomous vehicle, a processing unit receiving data from a vehicle.

7. A vehicle comprising:
sensors including a steering angle sensor, a position and orientation sensor, a steering actuator, and an axle load estimator; and
processing circuitry including:
a lateral tire force estimator configured to:
receive a steering angle from the steering angle sensor as well as a lateral acceleration and yaw acceleration from the position and orientation sensor, and
estimate, based thereon, a lateral tire force,
a pneumatic trail estimator configured to:
receive a control signal controlling the steering actuator as well as the estimated lateral tire force, and
estimate, based thereon, a pneumatic trail, and
a road friction estimator configured to:
receive an axle load from the axle load estimator as well as the estimated lateral tire force and pneumatic trail, and
estimate, based thereon, a road friction coefficient,
wherein at least one of:
i) the processing circuitry further includes at least one post-processing unit configured to:
derive a tolerance of the road friction coefficient, and/or
evaluate current lateral tyre force and alignment torque with respect to threshold values ($F_{y,lim}$, $M_{z,lim}$) for the lateral tire force and the alignment torque, or
ii) the road friction estimator is further configured to estimate the road friction coefficient by evaluating a predetermined nonlinear function of the pneumatic trail, wherein the nonlinear function is at least equal to any of;

$$\frac{F_y}{m_f g \, \text{tanh} \frac{3a - 9t_p}{2a}},$$

$$\frac{F_y}{m_f g \, \text{arctanh} \frac{3a - 9t_p}{2a}},$$

$$\frac{F_y}{m_f g} \frac{2a}{3a - 9t_p}$$

or scaled versions thereof, where g is gravitational acceleration, 2a is a tyre contact length, $F_y$ is lateral tyre force and $t_p$ is the pneumatic trail.

8. The vehicle of claim 7, wherein the position and orientation sensor includes an inertial sensor.

9. The vehicle of claim 7, wherein the pneumatic trail estimator is configured to derive an alignment torque from the control signal controlling the steering actuator.

10. A computer program comprising instructions which, when the program is executed by a computer, cause the computer to carry out the method of claim 1.

* * * * *